US006274078B1

(12) United States Patent
Dunyak et al.

(10) Patent No.: US 6,274,078 B1
(45) Date of Patent: Aug. 14, 2001

(54) METHOD OF REMOVING CORES FROM CERAMIC MATRIX COMPOSITE ARTICLES

(75) Inventors: Thomas J. Dunyak, West Chester; James D. Steibel, Hamilton; David R. Chang, Fairfield, all of OH (US); Peggy E. Jones, Saginaw, MI (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/237,972

(22) Filed: Jan. 27, 1999

(51) Int. Cl.[7] .............................. B06B 1/02; B29B 15/00
(52) U.S. Cl. .......................... 264/442; 264/635; 264/232; 264/234
(58) Field of Search .................................. 264/635, 624, 264/642, 643, 232, 234, 442

(56) References Cited

U.S. PATENT DOCUMENTS

| 4,999,145 | * | 3/1991 | Thibodeau | 264/1.2 |
| 5,403,153 | * | 4/1995 | Goetze | 416/229 A |
| 5,738,819 | * | 4/1998 | Feagin | 264/635 |
| 5,778,963 |   | 7/1998 | Parille et al. | 164/132 |
| 5,993,725 | * | 11/1999 | Zuk et al. | 264/635 |

* cited by examiner

Primary Examiner—Christopher A. Fiorilla
(74) Attorney, Agent, or Firm—Andrew C. Hess; David L. Narciso

(57) ABSTRACT

A method of removing a core from a CMC component in which the core was used to form an internal cavity. According to one embodiment of the invention, the core is removed from a fully densified CMC component by heating the component and core to a temperature at which the core deteriorates but below a temperature at which the component would melt or otherwise be damaged. According to a second embodiment of this invention, the component is only partially densified, and then impregnated with a coating material that is resistant to a leaching compound capable of removing the core. The core can then be removed using the leaching compound without damage to the internal surfaces of the component defined by the core when the component was fabricated.

18 Claims, No Drawings

US 6,274,078 B1

METHOD OF REMOVING CORES FROM CERAMIC MATRIX COMPOSITE ARTICLES

FIELD OF THE INVENTION

This invention relates to methods for fabricating ceramic matrix composite (CMC) articles. More particularly, this invention is directed to a method for removing a core used to form a cavity in a CMC article.

BACKGROUND OF THE INVENTION

Higher operating temperatures for gas turbine engines are continuously sought in order to increase their efficiency. However, as operating temperatures increase, the high temperature durability of the components of the engine must correspondingly increase. Significant advances in high temperature capabilities have been achieved through the formulation of iron, nickel and cobalt-base superalloys. However, components formed from superalloys must often be provided with some form of thermal and/or environmental protection in order to exhibit adequate service lives in certain sections of a gas turbine engine, such as the turbine, combustor and augmentor.

Silicon carbide (SiC)-based ceramic matrix composite (CMC) materials have been proposed as materials for certain components of gas turbine engines, such as the turbine blades and vanes. Various methods are known for fabricating SiC-based CMC components, including melt infiltration (MI), chemical vapor infiltration (CVI) and polymer pyrolysis (PIP) processes. Though these fabrication techniques significantly differ from each other, each involves the use of tooling or dies to produce a near-net-shape part through a process that includes the application of heat at various processing stages. As with turbine blades and vanes formed of more conventional superalloy materials, CMC blades and vanes are preferably equipped with cooling passages and holes in order to reduce their operating temperatures. Cooling passages and holes, as well as other cavities, are typically formed in CMC components using a combination of removable and expendable tooling. The external contours of hollow CMC components are typically formed using removable tooling that can be reused in most cases. Internal cavities can also be formed using removable tooling, though conventional silica ($SiO_2$) and alumina ($Al_2O_3$) cores widely used with investment casting methods have also been used.

Silica and alumina cores require removal with a leaching compound, including salts, hydrogen fluoride (HF) and alkalis such as sodium hydroxide (NaOH) and potassium hydroxide (KOH). In some cases, the exposed surfaces of a metal investment casting are coated with a masking material to prevent surface attack by the leaching compound—the internal surfaces of the casting cannot be masked due to the presence of the core. As a result, the critical external surfaces of the casting are protected, while less critical internal surfaces are subject to mild attack by the leaching compound. However, leaching compounds conventionally used to remove silica cores from investment castings aggressively attack many CMC materials, and particularly those (that contain silicon and boron, typically in the form of SiC and boron nitride (BN), respectively. Accordingly, attempts to remove silica cores from CMC components susceptible to attack by leaching compounds suffer unacceptable attack of its internal surfaces, which reduces the structural integrity of the CMC component.

Accordingly, it would be desirable if a method were available for fabricating a CMC component with an internal cavity formed by a core that can be readily removed without damaging the walls of the cavity.

SUMMARY OF THE INVENTION

The present invention generally provides a method of removing a core from a CMC component in which the core was used to form an internal cavity. According to one embodiment of the invention, the core is removed from a partially or fully densified CMC component by heating the component and core to a temperature at which the core deteriorates but below a temperature at which the component would melt or otherwise be damaged. In this embodiment, the core is preferably formed from a carbon-based material, an elemental silicon-based material, a ceramic body coated with an elemental silicon-based material, or a particulate ceramic material bonded together with an elemental silicon-based material.

According to a second embodiment of this invention, the component is only partially densified, and then impregnated with a coating material that is resistant to a leaching compound that is suitable for removing the core. The core can then be removed using the leaching compound without damage to the internal surfaces of the component defined by the core when the component was fabricated. In this embodiment, partial densification of the component permits infiltration of the coating material to the internal surfaces, which would otherwise be subject to aggressive attack by the leaching compound.

In view of the above, it will be appreciated that the present invention enables CMC components to be fabricated with one or more internal cavities without the surfaces of the cavities being damaged during the removal of the core or cores used to form the cavities. Accordingly, this invention enables precision internal cavities to be formed in a CMC component, such as cooling passages in a CMC turbine blade or vane.

Other objects and advantages of this invention will be better appreciated from the following detailed description.

DETAILED DESCRIPTION OF THE INVENTION

While the present invention is particularly applicable to the fabrication of CMC components of gas turbine engines, including combustor components, high pressure turbine vanes and blades, and other hot section components, the invention is generally applicable to any CMC component in which an internal cavity is desired. Furthermore, this invention is compatible with a variety of CMC materials, including SiC/SiC, SiC/Si—SiC, SiC/C, SiC/$Si_3N_4$ and oxide-based materials such as $Al_2O_3$/$Al_2O_3$—$SiO_2$. The benefits of this invention are particularly realized with CMC materials that contain silica, boron, silicon carbide and boron nitride, each of which is aggressively attacked by conventional leaching compounds such as salts, hydrogen fluoride, and caustics such as sodium and potassium hydroxide. In each embodiment of this invention, a CMC component can be conventionally fabricated using a core to form an internal cavity within the component. In a first embodiment of this invention, the core is formed from a material that permits its removal by means other than a conventional leaching compound, while a second embodiment of this invention provides for a method of processing the CMC component to enable the use of a protective coating that allows conventional leaching compounds to be used to remove the core without resulting in attack of the surfaces of the component.

According to the first embodiment of this invention, after the CMC component has been formed, which conventionally entails partially or fully densifying the CMC material by known methods, the core is removed from the cavity by heating the component and the core to a temperature at which the core deteriorates, but below that which would damage the component, e.g., its melting temperature. Suitable core materials for use with this embodiment include carbon-based materials, elemental silicon based materials, ceramic bodies coated with elemental silicon-based materials, and particulate ceramic materials bonded together with elemental silicon-based materials. An example of a preferred carbon-based core material is graphite, which can be decomposed to carbon dioxide and carbon monoxide or evaporated by oxidation in air or an oxygen-rich atmosphere at elevated temperatures. Suitable temperatures for this purpose are generally about 650° C. to about 800° C. Depending on the size of the core, two days or more may be required to remove a graphite core in this manner. The time required to remove a graphite core can be reduced by making the core hollow, and by agitating the oxidizing atmosphere, e.g., flowing air over the component. While graphite is preferred, other carbon-based materials could be used to form the core, including phenolic resins containing a filler material that is compatible with the CMC material and CMC processes.

As noted above, elemental silicon-based materials are also suitable as the core material. By use of the term "elemental," this invention distinguishes silicon and doped silicon from silicon compounds, most notably silica conventionally used as a core material. In addition to relatively pure silicon, silicon doped with iron, boron or nickel has a lower melting temperature than CMC constituents such as silicon carbide and boron nitride. As a result, forming the core from these materials enables the core to be removed from the CMC component by heating the component and core above the melting temperature of the core but below that which would damage the component. Any residual material from a core formed of these materials would not be detrimental to CMC components or their subsequent processing, and therefore would not require removal.

The remaining core materials mentioned above for the first embodiment also make use of the relatively low melting temperatures of silicon and doped silicon. For example, a core formed to have a base of silica or silicon carbide and coated with silicon or doped silicon can be removed from an internal cavity of a CMC component by heating the component so that the coating melts, thereby providing sufficient diametrical clearance to permit removal of the silica or silicon carbide base that remains. Removal of the core can be assisted with ultrasonic or vibration treatments. Alternatively, the core can be formed of a particulate material whose individual particles are bonded together with silicon and doped silicon, which enables the core to be removed by heating the core above the melting temperature of the silicon or doped silicon bonding material. Because melting of only the bonding material is required, the particulate material can be formed of silicon carbide or conventional core materials such as silica and alumina, alone or in combination. Again, ultrasonic and vibration can be used to assist in removing the residual particulate material after the bonding material has been melted.

In the second embodiment of this invention, the entire core can be formed of conventional core materials, such as of silica and alumina. However, instead of fully densifying the CMC component prior to removal of the core, the component is only partially densified and then impregnated with a coating material, such as conventional waxes or polymer resins such as epoxies. Impregnation of the component can be achieved using various techniques, such as heating the component above the melting temperature of the coating material and under pressure to encourage infiltration of the coating material into the component and the surface regions of the component contacting the core. The component and its core and coating material are then cooled so that the coating material forms a solid protective coating over the CMC fibers and matrix, after which the core can be removed using conventional leaching compounds, including salts, hydrogen fluoride, sodium hydroxide and potassium hydroxide. After leaching of the core, the CMC component is preferably heated to a temperature sufficient to melt or burn out the coating material, and then further densified and processed in a conventional manner.

In view of the above, those skilled in the art will appreciate that the present invention is generally applicable to all CMC fabrication processes, especially melt infiltration (MI), chemical vapor infiltration (CVI) and polymer pyrolysis (PIP). In the case of CVI and PIP, the cores of the first embodiment of this invention can be removed after partial or full densification of the CMC component. In the case of MI, the core is preferably removed after only partial densification of the CMC preform, which in the case of a SiC/SiC composite consists of SiC fibers and BN and SiC fiber coatings infiltrated into the preform (by CVI). At this point, the preform is rigid and the component shape has been defined. The core is then removed prior to melt infiltration of silicon into the preform (matrix densification), necessitating that the core material must withstand the process of infiltrating the preform with the BN and SiC fiber coatings (e.g., about 1000° C.), but must then melt or be otherwise removed at a temperature below that which is subsequently sustained during silicon melt infiltration (e.g., about 1420° C.). Each of the core materials discussed above under the first embodiment meet this temperature window requirement. For example, graphite can be fully evaporated to leave no residue (gaseous removal) within this temperature window. For those core materials containing silicon, any silicon residue is not detrimental, since matrix densification entails infiltrating molten silicon into the preform.

While the invention has been described in terms of particular and preferred embodiments, it is apparent that other forms could be adopted by one skilled in the art. Accordingly, the scope of the invention is to be limited only by the following claims.

What is claimed is:

1. A method of forming a ceramic matrix composite component, the method comprising the steps of:
    fabricating a ceramic matrix composite component using a core to form a cavity within the component, wherein the core is formed from a material selected from the group consisting of elemental silicon-based materials, a ceramic body coated with an elemental silicon-based material, and particulate ceramic materials bonded together with an elemental silicon-based material; and then
    removing the core from the cavity by heating the component and the core to a temperature at which the core deteriorates but below a melting temperature of the component.

2. A method as recited in claim 1, wherein the fabricating step is a process selected from the group consisting of melt infiltration, chemical vapor infiltration and polymer pyrolysis.

3. A method as recited in claim 1, wherein the core is partially densified before the step of removing the core from the component.

4. A method as recited in claim 1, wherein the core is fully densified before the step of removing the core from the component.

5. A method as recited in claim 1, wherein the core is formed of silicon doped with iron, boron or nickel.

6. A method as recited in claim 1, wherein the core is formed of silicon or doped silicon, and the step of removing the core from the component comprises melting the core.

7. A method as recited in claim 1, wherein the core is formed of silica or silicon carbide and has a coating of silicon or doped silicon, and wherein the step of removing the core from the component comprises melting the coating so as to permit removal of the silica or silicon carbide.

8. A method as recited in claim 7, wherein removal of the core is performed with the assistance of ultrasonic or vibratory energy.

9. A method as recited in claim 1, wherein the core is formed of a particulate material whose individual particles are bonded together with a bonding material selected from the group consisting of silicon and doped silicon, and wherein the step of removing the core from the component comprises melting the bonding material to permit removal of the particulate material.

10. A method as recited in claim 9, wherein the particulate material is selected from the group consisting of silica, silicon carbide and combinations thereof.

11. A method of forming a ceramic matrix composite component, the method comprising the steps of:

forming a core from a material selected from the group consisting of elemental silicon-based materials, a ceramic body coated with an elemental silicon-based material, and particulate ceramic materials bonded together with an elemental silicon-based material;

fabricating a ceramic matrix composite component using the core to form a cavity within the component, the ceramic matrix composite component being formed of a material selected from the group consisting of SiC/SiC, SiC/Si—SiC, SiC/C, SiC/$Si_3N_4$; and then removing the core from the cavity by heating the component and the core to a temperature sufficient to deteriorate the core but below a melting temperature of the component.

12. A method as recited in claim 11, wherein the core is formed of silicon or doped silicon, and the step of removing the core from the component comprises melting the core.

13. A method as recited in claim 11, wherein the core is a body formed of silica or silicon carbide and has a coating of silicon or doped silicon, and wherein the step of removing the core from the component comprises melting the coating so as to permit removal of the body.

14. A method as recited in claim 11, wherein the core is formed of a particulate material whose individual particles are bonded together with a bonding material selected from the group consisting of silicon and doped silicon, and wherein the step of removing the core from the component comprises melting the bonding material to permit removal of the particulate material.

15. A core for forming a ceramic matrix composite component, the core comprising a material selected from the group consisting of elemental silicon-based materials, a ceramic body coated with an elemental silicon-based material, and particulate ceramic materials bonded together with an elemental silicon-based material.

16. A core as recited in claim 15, wherein the core is formed of silicon or doped silicon.

17. A core as recited in claim 15, wherein the core is a body formed of silica or silicon carbide and has a coating of silicon or doped silicon.

18. A core as recited in claim 15, wherein the core is formed of a particulate material whose individual particles are bonded together with a bonding material selected from the group consisting of silicon and doped silicon.

* * * * *